United States Patent

Bleha et al.

[11] Patent Number: 5,059,220
[45] Date of Patent: Oct. 22, 1991

[54] COMPOSITE POLYMERIC MEMBRANES FOR THE SEPARATION OF MIXTURES OF GASES AND THE METHOD OF PREPARATION THE SAME

[75] Inventors: Miroslav Bleha; Jan Schauer; Jan Lokaj, all of Prague, Czechoslovakia; Galina A. Polockaja, Leningrad-Puškin, U.S.S.R.; Jurij P. Kuzněcov, Leningrad, U.S.S.R.; Kira A. Romaškova, Leningrad, U.S.S.R.

[73] Assignees: Ceskoslovenska Akademie ved, Praha, Czechoslovakia; Akademija nauk SSSR, Moscow, U.S.S.R.

[21] Appl. No.: 438,330

[22] Filed: Nov. 15, 1989

[30] Foreign Application Priority Data

Nov. 22, 1988 [SU] U.S.S.R. ............................ 4638856[I]
Aug. 30, 1989 [CS] Czechoslovakia .................... 5047-89

[51] Int. Cl.$^5$ ...................... B01D 53/22; B01D 71/64
[52] U.S. Cl. .......................................... 55/158; 55/16; 55/68
[58] Field of Search ............................ 55/16, 68, 158

[56] References Cited

U.S. PATENT DOCUMENTS

| | | | |
|---|---|---|---|
| 3,350,844 | 11/1967 | Robb | 55/16 |
| 4,180,553 | 12/1979 | Null et al. | 55/16 X |
| 4,181,675 | 1/1980 | Makin et al. | 55/16 X |
| 4,214,020 | 7/1980 | Ward et al. | 55/16 X |
| 4,230,463 | 10/1980 | Henis et al. | 55/16 |
| 4,468,500 | 8/1984 | Malon et al. | 55/16 X |
| 4,468,501 | 8/1984 | Zampini et al. | 55/16 X |
| 4,468,502 | 8/1984 | Malon et al. | 55/16 X |
| 4,468,503 | 8/1984 | Zampini et al. | 55/16 X |
| 4,528,004 | 7/1985 | Makino et al. | 55/16 X |
| 4,530,703 | 7/1985 | Malon et al. | 55/16 |
| 4,647,297 | 3/1987 | Zampini | 55/16 X |
| 4,652,283 | 3/1987 | Zampini et al. | 55/158 |
| 4,806,189 | 2/1989 | Kraus et al. | 55/158 X |

FOREIGN PATENT DOCUMENTS

| | | | |
|---|---|---|---|
| 0160435 | 10/1985 | European Pat. Off. | 55/158 |
| 0298531 | 1/1989 | European Pat. Off. | 55/158 |
| 58-180206 | 10/1983 | Japan | |
| 60-041524 | 3/1985 | Japan | 55/158 |

Primary Examiner—Robert Spitzer
Attorney, Agent, or Firm—Leydig, Voit & Mayer

[57] ABSTRACT

Highly selective membranes for the separation of mixtures He/N$_2$ and O$_2$/N$_2$, which have suitable mechanical properties and high permeability are dislcosed. They consist of a polymeric porous base from poly-2,6-dimethyl-1,4-phenyleneoxide and a polymeric selective layer formed from polyamidoimide of the general formula I, where R =

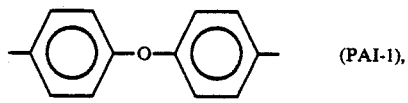

(PAI-1),

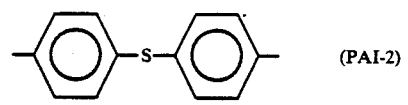 (PAI-2)

or

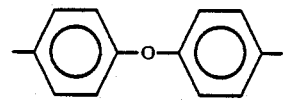

70% and

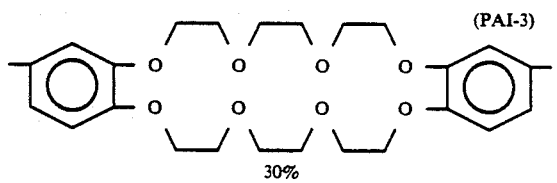 (PAI-3)

30% and n = 140–220

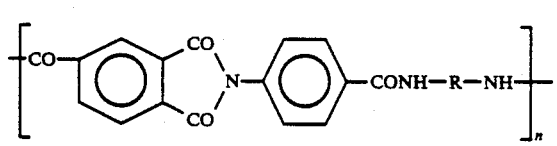

I or from an interpolymeric equimolar complex of PAI-1 with polyvinylpyrrolidone, or from an aromatic polyimide of the general formula II, where X is —O— or

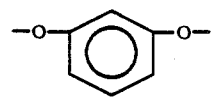

and n = 150–230

(Abstract continued on next page.)

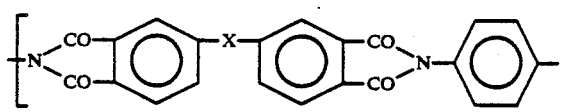

II

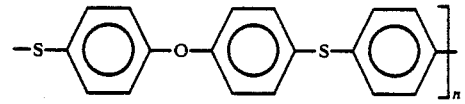

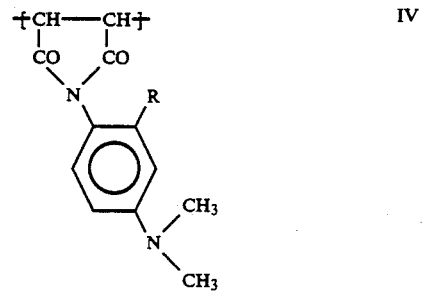

or of the general formula III, where n=150-240

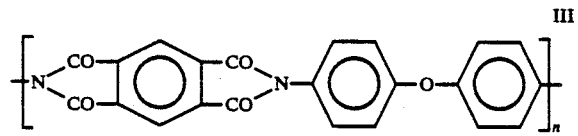

or from polymeric imides of the general formula IV, where R=H or CH₃ or also from their copolymers with styrene, methyl methacrylate, methyl acrylate, and dimethylaminoethyl methacrylate.

A method for the preparation of composite polymeric membranes consists of saturation of the porous base from poly-2,6-dimethyl-1,4-phenyleneoxide with an organic solvent inert to it, e.g. with $C_7H_{16}$ to $C_{10}H_{22}$ aliphatic hydrocarbons or their mixtures, drying, and coating with a 1–25 wt.-% solution of the selective polymer in an organic solvent which is incompatible with the organic liquid, e.g. N-methylpyrrolidone, N,N-dimethylformamide, N,N-dimethylacetamide or their mixtures.

6 Claims, No Drawings

COMPOSITE POLYMERIC MEMBRANES FOR THE SEPARATION OF MIXTURES OF GASES AND THE METHOD OF PREPARATION THE SAME

The invention pertains to composite polymeric membranes for the separation of mixtures of gases and to a method of their preparation.

The basic requirements for membranes used in the membrane separation of gases is a high permeability and selectivity of separation (Kesting R.B., "Synthetic Polymer Membranes", New York, A Willey-Interscience Publication, 1985, p.22). Specific membranes should be chosen for the separation of various vapours and gases. In order to attain a high permeability of gases at the retained selectivity, the thickness of membranes has to be at least 2 μm, however the physico-technical parameters become unsatisfactory, microcracks and pores occur, and the membrane does not resist the loading.

These shortcomings are overcome in composite membranes, which are formed from a thin nonporous layer for gas separation created on a microporous polymer base. The base provides the required mechanical and application properties and, at the same time, practically does not affect the permeability and selectivity. On the contrary, the selective separation layer may form its very thin to as much as molecular coating.

Various methods for the preparation of composite membranes for gas separation exist, in particular there is known a method for the preparation of selectively permeable membranes (Japan Published patent application No. 58-180,206; patent class B01D13/04, B01D53/22; published Oct. 21, 1983) consisting in dipping a porous polymeric base with pore diameter of 0.001–5 μm into a bath with a precipitant which improves the pores of base and creates a thin layer on the surface. A film is created on the base obtained in this way by applying a solution of polymer in an organic solvent and the resulting product is then dried. Polysiloxanes, vinyl polymers and copolymers, polycarbonates, polyesters, and cellulose derivatives are used as polymers dissolved in organic solvents (halogenated hydrocarbons, aliphatic and cyclic hydrocarbons, ethers, ketones, aldehydes, and/or amines). As a porous base there can be used a molded film based on polypropylene, polysulfone, poly(vinyl chloride), polytetrafluoroethylene, and/or cellulose acetate. Water, alcohols, ethers, or their mixtures are used as the precipitant for filling the pores. The membrane prepared in this way was evaluated by the permeability for the mixture oxygen-nitrogen and had the selectivity coefficient $\alpha_{O_2/N_2} = 1.7$–$2.3$.

The main disadvantage of this known method is a low

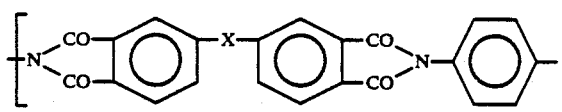

selectivity of the prepared membranes, which are determined only for the separation of the gas mixture oxygen/nitrogen.

These shortcomings are removed in membranes according to the present invention, which have higher selectivity in the separation of gas mixtures helium/nitrogen and oxygen/nitrogen have convenient mechanical properties and attain a high level of permeability. An object of the present invention is to provide composite polymeric membranes for the separation of mixtures of gases, consisting of a polymeric porous base based on poly-2,6-dimethyl-1,4-phenyleneoxide and a polymeric selective layer. The polymeric selective layer may be formed from polyamidoimide of the general formula I

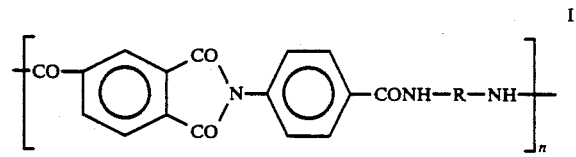

at $n = 140$–$220$, where R =

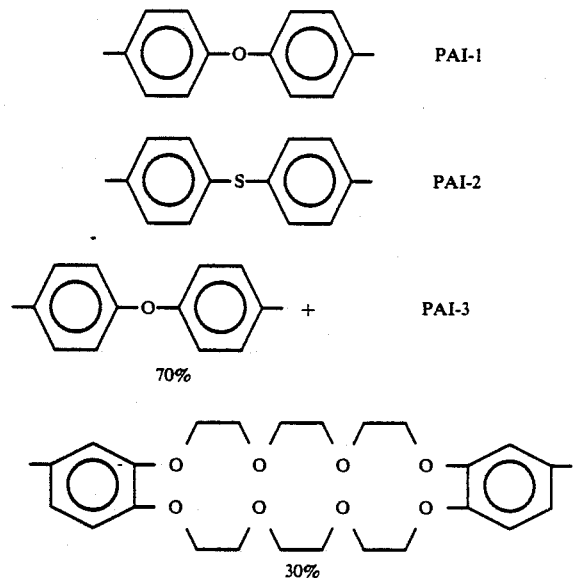

or from an interpolymeric equimolar complex of PAI-1 with polyvinylpyrrolidone. The complex of PAI-1 with polyvinylpyrrolidone serves for the additional enhancement of selectivity. As a polymeric selective layer there may be also used, according to the invention, the polymers based on aromatic polyimides with the general formula II

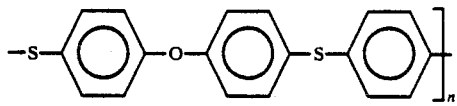

where X means —O— or

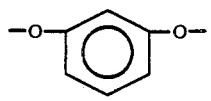

and n=150-230, or with the general formula III

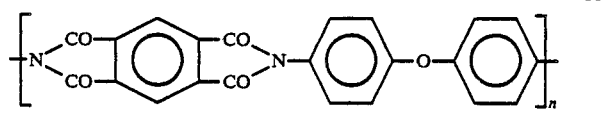

where n=150-240.

As the polymeric selective layer they may be also used, according to the invention, polymeric imides of the general formula IV

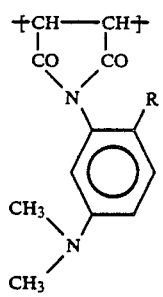

where R=H or CH$_3$, or also their copolymers with the monomers selected from the group comprising styrene, methyl methacrylate, methyl acrylate and dimethylaminoethyl methacrylate.

A method for the preparation of composite polymeric membranes for the separation of mixtures of gases according to the invention consists in saturation of the polymeric porous base based on poly-2,6-dimethyl-1,4-phenyleneoxide with an organic liquid filling pores of the base.

N-methylpyrrolidone, N,N-dimethylacetamide, N,N-dimethylformamide or their mixtures are used as the solvent for polymer.

As the organic liquid incompatible with the solvent, there are used compounds chosen from the homologous series comprising liquid aliphatic hydrocarbons C$_7$H$_{10}$ to C$_{10}$H$_{22}$ or their mixtures.

An analysis of the state of art revealed that no information exist about the technology for forming polyamidoimide, polyimide, or imide membrane from a solvent on a base with pores saturated with an organic liquid inert towards the polymeric substance of the base and incompatible with the solvent for polymer.

The selectivity of membrane systems formed in this way is high in particular for the separation of mixtures He/N$_2$, O$_2$/N$_2$, and similar mixtures. The preparation of these membrane systems is simpler than for other polymer systems mentioned in literature. The polymers employed are highly resistant both chemically and thermally and enable to use the membranes in applications with high technological demands.

The measured coefficients of selectivity are in many examples higher than for known systems and result in a high efficiency of separation processes on these membranes.

The invention is further illustrated in the examples of performance without limiting the scope to these examples only.

EXAMPLE 1

A layer 350 μm thick was cast on a glass plate 10 cm×10 cm from the 10% solution of PAI-1 in N-methylpyrrolidone and dried in air at 60° C. and at 40° C. in vacuum for several days. The prepared membrane is homogeneous and suitable for separation. The film thickness is 20 μm.

$P_{He}=2.56\times 10^{-7}$ cm$^3$/cm$^2$.s.cmHg $\alpha_{He/N_2}=18.3$ $P_{N_2}=0.145\times 10^{-7}$ cm$^3$/cm$^2$.s.cmHg

EXAMPLE 2

A layer 350 μm thick was cast from the 8% solution of poly-2,6-dimethyl-1,4-phenyleneoxide in the mixture chloroform-butanol (85:15 w/w) on a glass plate with dimensions 20 cm×20 cm and the plate was dipped, after 20 s, into a coagulation bath with ethanol for 30 to 40 min. The drying was carried out in air. The membrane prepared in this way is microporous and not suitable for separation:

$P_{He}=2350\times 10^{-7}$ cm$^3$/cm$^2$.s.cmHg $\alpha_{He/N_2}=1$ $P_{N_2}=2310\times 10^{-7}$ cm$^3$/cm$^2$.s.cmHg It represents the material applicable as the base.

EXAMPLE 3

A layer 350 μm thick was cast from the 8% solution of poly-2,6-dimethyl-1,4-phenyleneoxide in the mixture chloroform-butanol (85:15 w/w) on a glass plate with dimensions 20 cm×20 cm. After 20 s, the plate was immersed into a coagulation bath with ethanol for 30–40 min and then into a bath with the mixture heptane-decane (80:20 v/v), allowed for 2 h and dried in air. A 3-% solution of PAI-1 in N-methylpyrrolidone was cast on the microporous base prepared in this way. The membrane was placed vertically to enable the excess of solution to flow off. The membrane was dried at 40° C. in vacuum. The yellow layer of PAI-1 was visually homogeneous, exhibited the same separation selectivity as the homogeneous membrane from PAI-1 (see example 1), but has a better permeability:

$P_{He}=10.3\times 10^{-7}$ cm$^3$/cm$^2$.s.cmHg $\alpha_{He/N_2}=18$ $P_{N_2}=0.57\times 10^{-7}$ cm$^3$/cm$^2$.s.cmHg

EXAMPLE 6

The microporous base was prepared by the method described in example 3.

The 3-% solution of interpolymeric complex PAI-1-PVP (1:1 mol/mol) was prepared by mixing of 1.2 g PAI-1 and 0.28 g PVP in 50 ml of the mixture N-methylpyrrolidone-N,N-diethylformamide (50:50 w/w) and cast on the base. The membrane was placed vertically to enable the excess of solution to flow off. The membrane was dried at 40° C. in vacuum.

The examples 3 to 11, which are given in Table 1, were carried out according to the procedure described in example 3.

TABLE 1

Experimental results

| Example No. | Base | Organic liquid | Polymer concn. wt. % | Solvents | Thickness μm | Permeability cm³/cm²·s·cmHg $P_{He} \cdot 10^7$ | $P_{N_2} \cdot 10^7$ | He/N₂ |
|---|---|---|---|---|---|---|---|---|
| 1 | — | — | 8% PAI-1 | MP | 20 | 2,56 | 0,145 | 17,6 |
| 2 | PFO | — | — | — | 20 | 2350 | 2310 | 1 |
| 3 | PFO | C₇ + C₁₀ | 3% PAI-1 | MP | 2,0 | 10.3 | 0,57 | 18,1 |
| 4 | PFO | C₉ | 3% PAI-2 | DMAA | 2,0 | 10,0 | 0,55 | 18,2 |
| 5 | PFO | C₁₀ | 1% PAI-3 | MP | 0,7 | 34,0 | 1,40 | 24,2 |
| 6 | PFO | C₈ + C₁₀ | 3% PAI-1:PVP | MP + DMFA | 1,5 | 29,3 | 0,63 | 46,2 |
| 7 | PFO | C₁₀ | 2% PAI-1:PVP | MP + DMFA | 1,0 | 32,0 | 0,56 | 57,1 |
| 8 | PFO | C₁₀ | 4% PAI-1 | MP | 4,0 | 5,4 | 0,32 | 17 |
| 9 | PFO | C₈ | 0,5% PAI-1 | MP | 0,3 | the defective layer | | |
| 10 | PFO | C₁₂ | 3% PAI-1 | MP | | back off adhesive | | |
| 11 | PFO | — | 1% PAI-1 | MP | | deformed face | | |

The values of transport properties for membranes from other materials are given in Table 2 for the sake of comparison

TABLE 2

Literature data

| No. | Polymer | Permeability coefficient cm³/cm²·s·cmHg $P_{HE} \times 10^8$ | $P_{N_2} \times 10^8$ | He/N₂ |
|---|---|---|---|---|
| 1 | Polyisoprene | 0,35 | 0,10 | 3,5 |
| 2 | Polyethylene | 0,05 | 0,01 | 5,0 |
| 3 | Polyvinyltrimethylsilane | 1,8 | 0,11 | 16,4 |
| 4 | Polyamide-II | 0,016 | 0,0002 | 80,0 |

Tepljakov V. V., Durgarjan S. G. "Korelacionnyj analiz parametrov gazopronicaismosti polymerov" - Vysokomol soed. A., 26, 1498 (1984).

EXAMPLE 12

A microporous membrane was prepared by casting a 10-wt. % solution of poly-2,6-dimethyl-1,4-phenyleneoxide in the mixture chloroform-butanol (85:15 w/w) as a 350 μm thick layer on a glass plate and coagulation in the bath with ethanol. It was modified for the application of a selective layer by the subsequent exposure in a bath with decane for 2 hours and drying at laboratory temperature for 5 hours. A 3-wt. % solution of the basic polyimide (formula II, X=—O—) in N-methylpyrrolidone was cast on the base. An excess of the solution was removed by placing the membrane in the vertical position. The membrane was prepared for use after drying at 40° C. in vacuum. The measurement of membrane permeability for gases and their mixtures gave the selectivity coefficient He/N₂ α=36.5 and O₂/N₂ α=4.06.

EXAMPLE 13

A microporous membrane was prepared from a 8-wt. % solution of poly-2,6-dimethyl-1,4-phenyleneoxide in the mixture chloroform-butanol (85:15 w/w) by the procedure given in example 12. After exposure in the mixture heptane-decane for 3 hours and drying at laboratory temperature for 4 hours, a selective layer with the thickness approx. 15 μm was formed on this base from a 3-wt. % solution of polyimide (formula II, where X=

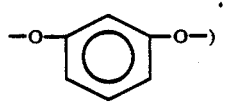

in N-methylpyrrolidone. The selectivity coefficients determined for this membrane and mixtures He/N₂ and O₂/N₂ were $\alpha_{He/N_2}=65$ and $\alpha_{O_2/N_2}=4.3$.

EXAMPLE 14

A microporous membrane from poly-2,6-dimethyl-1,4-phenyleneoxide was prepared and modified as a base as in example 12. A layer is first formed on this base by casting the polymer based on the compound with formula V

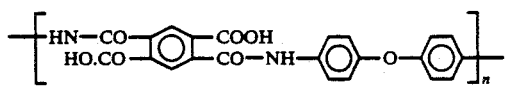

from its 5-wt. % solution in N,N-dimethylformamide. The membrane layer of the type given by formula III results in the following condensation reaction after about b 10 min by treatment with the mixture pyridine-acetic anhydride (1:1 w/w). The resulting membrane is dried in vacuum at 40° C. The following selectivity coefficients were determined by measuring the permeability for gases and their mixtures: $\alpha_{He/N_2}=110.8$ and $\alpha_{O_2/N_2}=3.9$.

EXAMPLE 15

A microporous membrane was prepared as a base similarly as in example 13 and modified by application of a selective layer by the method according to example 12. A 3-wt. % solution of polymer (III), the same as in example 3, in dimethylformamide was cast on the modified base. An excess of the solution was removed by placing the membrane into vertical position. The membrane was dried and then poured with the mixture pyridine-acetic anhydride (1:1 w/w). After completion of the condensation reaction, the membrane was dried in vacuum at 40° C. The following selectivity coefficients were determined for the membrane: $\alpha_{He/N_2}=71$ and $\alpha_{O_2/N_2}=4.1$.

EXAMPLE 16

The membrane which was prepared from poly-2,6-dimethyl -1,4-phenyleneoxide according to example 12 was used as a base for the preparation of a composite membrane from the copolymer of compound IV, where R=CH₃, with styrene (molar ratio 1:2). A 15-wt. % solution of this copolymer in dimethylformamide was poured on the base, an excess of solution was removed, and the membrane was dried in vacuum at 40° C. The following sensitivities were determined by measurements with the membrane: $\alpha_{He/N_2}=14.5$, $\alpha_{O_2/N_2}=2.8$.

Table 3 shows the transport properties of further membranes prepared according to examples 12 to 15.

TABLE 3

| Sample | Polyimide | Permeability of membrane × $10^6$ cm³/cm² · s · cmHg | | | | Selectivity | |
|---|---|---|---|---|---|---|---|
| | | He | $N_2$ | $O_2/N_2$ | $CO_2$ | He/$N_2$ | $O_2/N_2$ |
| 1 | PI-11 | 1,8 | 0,033 | 0,11/0,03 | 0,74 | 55 | 3,2 |
| 2 | PI-12 | 1,8 | 0,029 | | | 63 | |
| 3 | PI-12 | 1,46 | 0,029 | | | 50 | |
| 4 | PI-11 | 1,78 | 0,045 | | | 40 | |
| 5 | PI-11 | 3,4 | 0,093 | 0,47/0,11 | | 36,5 | 4,05 |
| 6 | PI-12 | 1,3 | 0,02 | 0,099/0,023 | | 65 | 4,3 |
| 7 | PI-12 | 5,3 | 0,185 | 0,637/0,155 | | 29 | 4,1 |
| 8 | PI-2 | 10,7 | | 0,895/0,245 | 3,93 | 44 | 3,7 |
| 9 | PI-2 | 8,53 | | 1,4/0,41 | | 21 | 3,4 |

PI-11 — polyimide with formula II, where X = —O—

PI-12 — polyimide with formula II, where X = 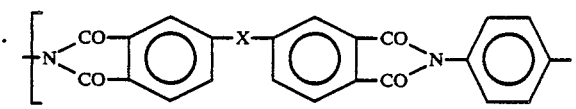

PI-2 — Polyimide with formula III.

We claim:

1. A composite polymeric membrane for the separation of mixtures of gases, wherein said membrane comprises a porous polymeric base of poly-2,6-dimethyl-1,4-phenyleneoxide and a polymeric selective layer formed from a polyamidoimide of the general formula I

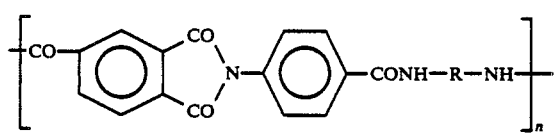

at n = 140 to 220, where

R =

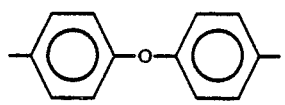  PAI-1

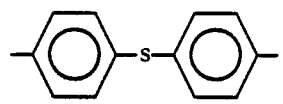  PAI-2

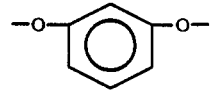 + PAI-3

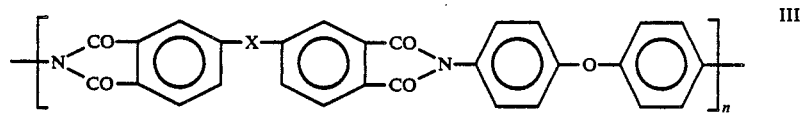

or from the interpolymeric equimolar complex of polyamidoimide with polyvinylpyrrolidone.

2. The composite membranes according to claim 1, wherein the thin polymeric selective layer is formed from aromatic polyimides of the general formula II

where X means —O— or

—O—⌬—O— and n = 150–230, or the formula III

where n = 150–240.

3. The composite membranes according to claim 1, wherein the polymeric selective layer is formed from imides of polymeric type with the general formula IV

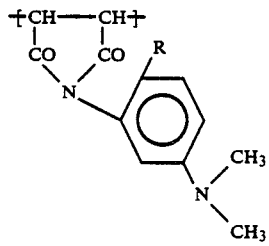

where R = H or CH₃ or from their copolymers with the monomers selected from the group comprising styrene, methyl methacrylate, methyl acrylate and dimethylaminoethyl methacrylate.

4. A method for the preparation of a composite membrane for the separation of mixtures of gases comprising saturating a polymeric porous base based on poly-2,6-dimethyl-1,4-phenyleneoxide with an organic liquid which is inert towards poly-2,6-dimethyl-1,4-phenyleneoxide, the base is dried and a 1 to 25 wt. % solution of a selective polymer in a solvent, which is incompatible with the organic liquid, is applied on its surface.

5. The method according to claim 4, wherein N-methylpyrrolidone, N,N-dimethylformamide, N,N-dimethylacetamide or their mixtures are used as the solvent.

6. The method according to claim 4, wherein a compound selected from the homologous series of aliphatic hydrocarbons $C_7H_{16}$ to $C_{10}H_{22}$ or their mixtures is used as the organic liquid incompatible with the solvent.

* * * * *